(12) United States Patent
Noda

(10) Patent No.: US 7,184,225 B1
(45) Date of Patent: Feb. 27, 2007

(54) ASPHERICAL TYPE IMAGING LENS ARRAY

(75) Inventor: Sayuri Noda, Taichung (TW)

(73) Assignee: Largan Precision Co., Ltd., His-Tun Dist. (TW)

(*) Notice: Subject to any disclaimer, the term of this patent is extended or adjusted under 35 U.S.C. 154(b) by 0 days.

(21) Appl. No.: 11/255,320

(22) Filed: Oct. 20, 2005

(51) Int. Cl.
*G02B 9/12* (2006.01)
(52) U.S. Cl. ...................... 359/784; 359/738
(58) Field of Classification Search ........ 359/784–788, 359/790–792
See application file for complete search history.

(56) References Cited

U.S. PATENT DOCUMENTS 6,961,191 B2 * 11/2005 Sato ........................... 359/785
7,064,905 B2 * 6/2006 Murakami et al. .......... 359/784

* cited by examiner

*Primary Examiner*—Jordan M. Schwartz
(74) *Attorney, Agent, or Firm*—Charles E. Baxley

(57) ABSTRACT

An aspherical type imaging lens array comprises, from object side to image side, at least an aperture, a first positive meniscus lens with a convex surface facing the object side, a second meniscus lens with a convex surface facing the image side, and a third lens meniscus lens with a convex surface facing the object side. The respective lenses are made of plastic and has two aspherical surfaces, a focal length of the aspherical type imaging lens array is f, a focal length of the second lens is f2, and a focal length of the third lens is f3, they satisfy the equation: $-0.20 < f/f2 < 0.15$, and $-0.25 < f/f3 < 0.20$.

3 Claims, 24 Drawing Sheets

(first embodiment)

focal length: f=3.41
F NO: F2.89
angle of view: 2ω=70.9°

|   | r | d | nd | νd |
|---|---|---|---|---|
| 1 | 1.086 | 0.48 | 1.54340 | 56.5 |
| 2 | 2.822 | 0.78 | | |
| 3 | −0.649 | 0.35 | 1.58340 | 30.2 |
| 4 | −0.772 | 0.03 | | |
| 5 | 5.950 | 0.84 | 1.51357 | 56.8 |
| 6 | 4.879 | 0.50 | | |
| 7 | ∞ | 0.50 | 1.51680 | 64.2 |
| 8 | ∞ | 0.61 | | |

$f/f_2 =$ 0.02
$f/f_3 =$ −0.05
$R_{31}/R_{32} =$ 1.22
$d_3/d_1 =$ 1.75

$T/f =$ 1.15
$\alpha =$ 23.0° (maximum incident angle of the imaging lens array)

| SPHERICAL ABERRATION L HEIGHT | | ASTIGMATIC FIELD FIELD HEIGHT S | M | DISTORTION (PER CENT) |
|---|---|---|---|---|
| 0 | 0 | 0 | 0 | 0 |
| 0.1 | 0.001059 | 0.1 | 0.000538 0.005763 | 0.04163 |
| 0.2 | 0.003674 | 0.2 | −0.0022 0.00624 | 0.06538 |
| 0.3 | 0.006384 | 0.3 | −0.00816 0.009247 | 0.03118 |
| 0.4 | 0.007321 | 0.4 | −0.01312 0.015516 | −0.03499 |
| 0.5 | 0.004676 | 0.5 | −0.01801 0.001716 | −0.17472 |
| 0.6 | −0.00289 | 0.6 | −0.02436 −0.02751 | −0.38637 |
| 0.7 | −0.01511 | 0.7 | −0.029 −0.04631 | −0.60589 |
| 0.8 | −0.02665 | 0.8 | −0.02716 −0.04371 | −0.80103 |
| 0.9 | −0.02167 | 0.9 | −0.01951 −0.00893 | −0.88028 |
| 1 | 0.017405 | 1 | −0.02003 0.058553 | −0.80477 |

(second embodiment)

focal length: f=3.36
F NO: F3.43
angle of view: 2ω=71.6°

|   | r | d | nd | νd |
|---|---|---|---|---|
| 1 | 1.016 | 0.43 | 1.54340 | 56.5 |
| 2 | 2.812 | 0.75 |  |  |
| 3 | −0.740 | 0.35 | 1.58340 | 30.2 |
| 4 | −0.877 | 0.05 |  |  |
| 5 | 16.389 | 0.87 | 1.51357 | 56.8 |
| 6 | 6.116 | 0.45 |  |  |
| 7 | ∞ | 0.50 | 1.51680 | 64.2 |
| 8 | ∞ | 0.52 |  |  |

$f/f_2=$ −0.02
$f/f_3=$ −0.17
$R_{31}/R_{32}=$ 2.68
$d_3/d_1=$ 2.02

$T/f=$ 1.12
$\alpha=$ 24.5° (maximum incident angle of the imaging lens array)

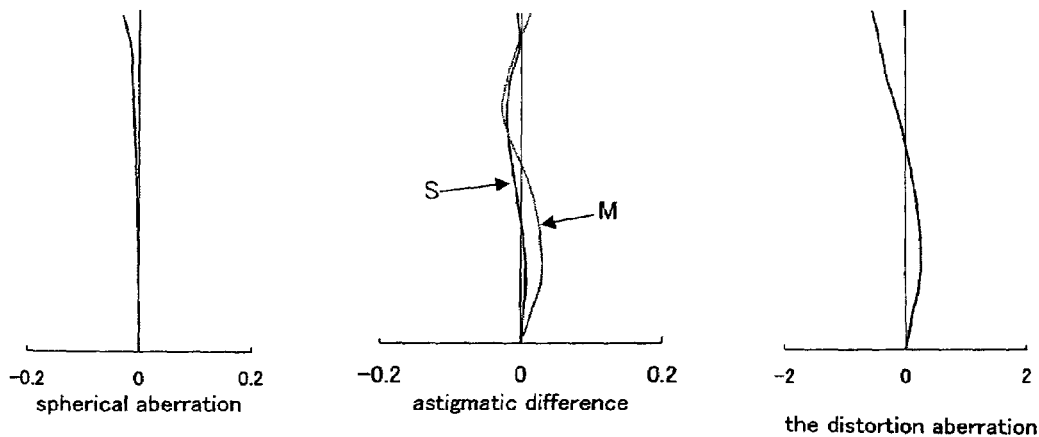

| −0.2  0  0.2 | −0.2  0  0.2 | −2  0  2 |
|---|---|---|
| spherical aberration | astigmatic difference | the distortion aberration |

| SPHERICAL ABERRATION | | ASTIGMATIC FIELD | | DISTORTION |
| L HEIGHT | | FIELD HEIGHT   S | M | (PER CENT) |
|---|---|---|---|---|
| 0 | 0 | 0 | 0 | 0 |
| 0.1 | −0.00022 | 0.1  0.003894 | 0.015687 | 0.10127 |
| 0.2 | −0.00084 | 0.2  0.007271 | 0.02889 | 0.22746 |
| 0.3 | −0.00181 | 0.3  0.004197 | 0.027334 | 0.24727 |
| 0.4 | −0.00308 | 0.4  −0.00255 | 0.021644 | 0.1946 |
| 0.5 | −0.00477 | 0.5  −0.01022 | 0.008804 | 0.10546 |
| 0.6 | −0.00706 | 0.6  −0.01737 | −0.0123 | −0.00635 |
| 0.7 | −0.00987 | 0.7  −0.02081 | −0.02696 | −0.14804 |
| 0.8 | −0.01246 | 0.8  −0.01564 | −0.02075 | −0.32636 |
| 0.9 | −0.01522 | 0.9  −0.00269 | −0.00545 | −0.43783 |
| 1 | −0.03015 | 1    −0.00616 | 0.013391 | −0.57087 |

FIG. 2B (thied embodiment)

focal length: f=3.37
F NO: F3.20
angle of view: 2ω=71.0°

|   | r | d | nd | νd |
|---|---|---|---|---|
| 1 | 1.025 | 0.46 | 1.54340 | 56.5 |
| 2 | 2.931 | 0.74 | | |
| 3 | -0.742 | 0.35 | 1.58340 | 30.2 |
| 4 | -0.895 | 0.03 | | |
| 5 | 11.820 | 0.89 | 1.51357 | 56.8 |
| 6 | 5.301 | 0.28 | | |
| 7 | ∞ | 0.50 | 1.51680 | 64.2 |
| 8 | ∞ | 0.65 | | |

$f/f_2=$ -0.07
$f/f_3=$ -0.17
$R_{31}/R_{32}=$ 2.23
$d_3/d_1=$ 1.93

$T/f=$ 1.11
$\alpha=$ 24.5° (maximum incident angle of the imaging lens array)

| -0.2  0  0.2 | -0.2  0  0.2 | -2  0  2 |
| spherical aberration | astigmatic difference | the distortion aberration |

| SPHERICAL ABERRATION L HEIGHT | | FIELD HEIGHT | ASTIGMATIC FIELD S | M | DISTORTION (PER CENT) |
|---|---|---|---|---|---|
| 0 | 0 | 0 | 0 | 0 | 0 |
| 0.1 | 0.0016 | 0.1 | 0.010185 | 0.030312 | 0.1898 |
| 0.2 | 0.006118 | 0.2 | 0.019191 | 0.044109 | 0.31237 |
| 0.3 | 0.01278 | 0.3 | 0.017312 | 0.039342 | 0.21015 |
| 0.4 | 0.020421 | 0.4 | 0.011898 | 0.039287 | 0.05612 |
| 0.5 | 0.027459 | 0.5 | 0.006455 | 0.031398 | -0.07446 |
| 0.6 | 0.03196 | 0.6 | 0.001093 | 0.007964 | -0.18709 |
| 0.7 | 0.032278 | 0.7 | -0.00167 | -0.01254 | -0.31692 |
| 0.8 | 0.028319 | 0.8 | 0.003494 | -0.00853 | -0.49447 |
| 0.9 | 0.022073 | 0.9 | 0.016231 | 0.02547 | -0.60505 |
| 1 | 0.01328 | 1 | 0.009022 | 0.060679 | -0.67572 |

(fourth embodiment)

focal length: f=3.38
F NO: F3.20
angle of view: 2ω=71.3°

| | r | d | nd | νd |
|---|---|---|---|---|
| 1 | 1.008 | 0.46 | 1.52510 | 56.4 |
| 2 | 2.989 | 0.74 | | |
| 3 | −0.744 | 0.36 | 1.58340 | 30.2 |
| 4 | −0.903 | 0.03 | | |
| 5 | 11.224 | 0.86 | 1.52510 | 56.4 |
| 6 | 5.619 | 0.52 | | |
| 7 | ∞ | 0.50 | 1.51680 | 64.2 |
| 8 | ∞ | 0.46 | | |

$f/f_2=$ −0.08
$f/f_3=$ −0.15
$R_{31}/R_{32}=$ 2.00
$d_3/d_1=$ 1.87

$T/f=$ 1.11
$\alpha=$ 24.5°  (maximum incident angle of the imaging lens array)

| SPHERICAL ABERRATION L HEIGHT | | ASTIGMATIC FIELD FIELD HEIGHT S | | M | DISTORTION (PER CENT) |
|---|---|---|---|---|---|
| 0 | 0 | 0 | 0 | 0 | 0 |
| 0.1 | 0.000299 | 0.1 | 0.008347 | 0.026832 | 0.17809 |
| 0.2 | 0.001168 | 0.2 | 0.01682 | 0.044156 | 0.36195 |
| 0.3 | 0.002527 | 0.3 | 0.015209 | 0.038784 | 0.35397 |
| 0.4 | 0.004183 | 0.4 | 0.008459 | 0.030604 | 0.25904 |
| 0.5 | 0.005717 | 0.5 | 0.00014 | 0.013679 | 0.14512 |
| 0.6 | 0.006587 | 0.6 | −0.00826 | −0.01118 | 0.02406 |
| 0.7 | 0.00671 | 0.7 | −0.01259 | −0.02244 | −0.12755 |
| 0.8 | 0.006783 | 0.8 | −0.00696 | −0.01007 | −0.37334 |
| 0.9 | 0.004719 | 0.9 | 0.00662 | 0.012488 | −0.65104 |
| 1 | −0.02183 | 1 | −0.00262 | 0.042981 | −0.93415 |

(fifth embodiment)

focal length: f=3.31
F NO: F2.90
angle of view: 2ω=72.5°

|   | r | d | nd | νd |
|---|---|---|---|---|
| 1 | 1.123 | 0.56 | 1.54340 | 56.5 |
| 2 | 3.133 | 0.68 | | |
| 3 | −0.670 | 0.35 | 1.60730 | 26.6 |
| 4 | −0.840 | 0.03 | | |
| 5 | 4.112 | 0.93 | 1.51357 | 56.8 |
| 6 | 5.400 | 0.59 | | |
| 7 | ∞ | 0.50 | 1.51680 | 64.2 |
| 8 | ∞ | 0.47 | | |

$f/f_2=$ −0.13
$f/f_3=$ 0.12
$R_{31}/R_{32}=$ 0.76
$d_3/d_1=$ 1.66

$T/f=$ 1.19
$\alpha=$ 23.1° (maximum incident angle of the imaging lens array)

| SPHERICAL ABERRATION L HEIGHT | | ASTIGMATIC FIELD FIELD HEIGHT | | | DISTORTION (PER CENT) |
|---|---|---|---|---|---|
| | | | S | M | |
| 0 | 0 | 0 | 0 | 0 | 0 |
| 0.1 | 0.001332 | 0.1 | −0.00004 | 0.004913 | 0.0473 |
| 0.2 | 0.004756 | 0.2 | −0.00395 | 0.002865 | 0.09638 |
| 0.3 | 0.008777 | 0.3 | −0.01376 | −0.0086 | 0.05805 |
| 0.4 | 0.011562 | 0.4 | −0.02562 | −0.0163 | −0.04723 |
| 0.5 | 0.011599 | 0.5 | −0.03625 | −0.02293 | −0.17254 |
| 0.6 | 0.008182 | 0.6 | −0.04436 | −0.03696 | −0.27799 |
| 0.7 | 0.001658 | 0.7 | −0.04836 | −0.06094 | −0.37573 |
| 0.8 | −0.00653 | 0.8 | −0.04567 | −0.08255 | −0.5346 |
| 0.9 | −0.01501 | 0.9 | −0.03654 | −0.05921 | −0.65289 |
| 1 | −0.03113 | 1 | −0.04522 | −0.01929 | −0.74218 |

(sixth embodiment)

focal length: f=3.32
F NO: F2.91
angle of view: 2ω=72.3°

| | r | d | nd | νd |
|---|---|---|---|---|
| 1 | 1.126 | 0.55 | 1.54340 | 56.5 |
| 2 | 3.224 | 0.68 | | |
| 3 | -0.672 | 0.35 | 1.60730 | 26.6 |
| 4 | -0.844 | 0.03 | | |
| 5 | 4.197 | 0.92 | 1.51357 | 56.8 |
| 6 | 5.461 | 0.59 | | |
| 7 | ∞ | 0.50 | 1.51680 | 64.2 |
| 8 | ∞ | 0.47 | | |

$f/f_2=$  −0.14
$f/f_3=$  0.12
$R_{31}/R_{32}=$  0.77
$d_3/d_1=$  1.67

$T/f=$  1.18
$\alpha =$  23.1°  (maximum incident angle of the imaging lens array)

spherical aberration        astigmatic difference        the distortion aberration

| SPHERICAL ABERRATION | | ASTIGMATIC FIELD | | DISTORTION |
| L HEIGHT | | FIELD HEIGHT S | M | (PER CENT) |
|---|---|---|---|---|
| 0 | 0 | 0 | 0 | 0 |
| 0.1 | 0.001176 | 0.1 | 0.00151 | 0.008986 | 0.07247 |
| 0.2 | 0.004098 | 0.2 | -0.00031 | 0.008946 | 0.14426 |
| 0.3 | 0.007198 | 0.3 | -0.00983 | -0.00585 | 0.0804 |
| 0.4 | 0.008584 | 0.4 | -0.0222 | -0.0137 | -0.07509 |
| 0.5 | 0.006799 | 0.5 | -0.03264 | -0.01384 | -0.23905 |
| 0.6 | 0.001423 | 0.6 | -0.03939 | -0.01763 | -0.35518 |
| 0.7 | -0.00648 | 0.7 | -0.04129 | -0.03299 | -0.43797 |
| 0.8 | -0.014 | 0.8 | -0.03659 | -0.05279 | -0.57496 |
| 0.9 | -0.01717 | 0.9 | -0.02633 | -0.0321 | -0.706 |
| 1 | -0.02071 | 1 | -0.03381 | 0.038296 | -0.78625 |

(seventh embodiment)

focal length: f=3.25
F NO: F2.85
angle of view: 2ω=73.1°

| | r | d | nd | νd |
|---|---|---|---|---|
| 1 | 1.067 | 0.46 | 1.54340 | 56.5 |
| 2 | 2.679 | 0.70 | | |
| 3 | -0.641 | 0.37 | 1.54340 | 56.5 |
| 4 | -0.752 | 0.03 | | |
| 5 | 5.710 | 0.87 | 1.54340 | 56.5 |
| 6 | 5.275 | 0.70 | | |
| 7 | ∞ | 0.50 | 1.51680 | 64.2 |
| 8 | ∞ | 0.42 | | |

$f/f_2 =$ 0.07
$f/f_3 =$ -0.01
$R_{31}/R_{32} =$ 1.08
$d_3/d_1 =$ 1.89

$T/f =$ 1.19
$\alpha =$ 23.1° (maximum incident angle of the imaging lens array)

-0.2　0　0.2
spherical aberration

-0.2　0　0.2
astigmatic difference

-2　0　2
the distortion aberration

| SPHERICAL ABERRATION L HEIGHT | | ASTIGMATIC FIELD FIELD HEIGHT S | | M | DISTORTION (PER CENT) |
|---|---|---|---|---|---|
| 0 | 0 | 0 | 0 | 0 | 0 |
| 0.1 | 0.003051 | 0.1 | 0.010965 | 0.033581 | 0.12574 |
| 0.2 | 0.01153 | 0.2 | 0.022779 | 0.056434 | 0.18339 |
| 0.3 | 0.023695 | 0.3 | 0.024515 | 0.062607 | 0.08502 |
| 0.4 | 0.037258 | 0.4 | 0.022533 | 0.068233 | -0.04617 |
| 0.5 | 0.049504 | 0.5 | 0.018547 | 0.055483 | -0.20453 |
| 0.6 | 0.056883 | 0.6 | 0.012798 | 0.028066 | -0.37459 |
| 0.7 | 0.055188 | 0.7 | 0.009082 | 0.004658 | -0.50195 |
| 0.8 | 0.042847 | 0.8 | 0.01264 | -0.0047 | -0.56809 |
| 0.9 | 0.029586 | 0.9 | 0.025885 | 0.02811 | -0.54369 |
| 1 | 0.044709 | 1 | 0.03396 | -0.00605 | -1.00429 |

(eighth embodiment)

focal length: f=3.25
F NO: F2.85
angle of view: 2ω=73.3°

|   | r | d | nd | νd |
|---|---|---|---|---|
| 1 | 1.078 | 0.47 | 1.54340 | 56.5 |
| 2 | 2.748 | 0.70 | | |
| 3 | -0.652 | 0.36 | 1.60730 | 26.6 |
| 4 | -0.772 | 0.03 | | |
| 5 | 5.376 | 0.88 | 1.51357 | 56.8 |
| 6 | 5.202 | 0.69 | | |
| 7 | ∞ | 0.50 | 1.51680 | 64.2 |
| 8 | ∞ | 0.44 | | |

$f/f_2 =$ 0.06
$f/f_3 =$ 0.01
$R_{31}/R_{32} =$ 1.03
$d_3/d_1 =$ 1.87

$T/f =$ 1.20
$\alpha =$ 23.1° (maximum incident angle of the imaging lens array)

| SPHERICAL ABERRATION L HEIGHT | | ASTIGMATIC FIELD FIELD HEIGHT S | | M | DISTORTION (PER CENT) |
|---|---|---|---|---|---|
| 0 | 0 | 0 | 0 | 0 | 0 |
| 0.1 | 0.00105 | 0.1 | 0.002449 | 0.011725 | 0.00938 |
| 0.2 | 0.003718 | 0.2 | 0.004062 | 0.02425 | -0.03135 |
| 0.3 | 0.006761 | 0.3 | 0.003081 | 0.039918 | -0.1067 |
| 0.4 | 0.008641 | 0.4 | 0.0031 | 0.059841 | -0.16222 |
| 0.5 | 0.007987 | 0.5 | 0.003623 | 0.062637 | -0.22942 |
| 0.6 | 0.004065 | 0.6 | 0.003708 | 0.049411 | -0.31844 |
| 0.7 | -0.00196 | 0.7 | 0.006432 | 0.040187 | -0.39924 |
| 0.8 | -0.00328 | 0.8 | 0.017048 | 0.049923 | -0.46974 |
| 0.9 | 0.020164 | 0.9 | 0.037629 | 0.100942 | -0.50806 |
| 1 | 0.107963 | 1 | 0.045996 | -0.02329 | -1.13698 |

(nineth embodiment)

focal length: f=3.25
F NO: F2.85
angle of view: 2ω=73.1°

| | r | d | nd | νd |
|---|---|---|---|---|
| 1 | 1.071 | 0.47 | 1.54340 | 56.5 |
| 2 | 2.733 | 0.70 | | |
| 3 | -0.648 | 0.35 | 1.58340 | 30.2 |
| 4 | -0.776 | 0.03 | | |
| 5 | 5.143 | 0.88 | 1.51357 | 56.8 |
| 6 | 5.570 | 0.69 | | |
| 7 | ∞ | 0.50 | 1.51680 | 64.2 |
| 8 | ∞ | 0.42 | | |

$f/f_2=$ 0.01
$f/f_3=$ 0.04
$R_{31}/R_{32}=$ 0.92
$d_3/d_1=$ 1.87
$T/f=$ 1.19
$\alpha=$ 23.1° (maximum incident angle of the imaging lens array)

| SPHERICAL ABERRATION | | | ASTIGMATIC FIELD | | DISTORTION |
| L HEIGHT | | FIELD HEIGHT | S | M | (PER CENT) |
|---|---|---|---|---|---|
| 0 | 0 | 0 | 0 | 0 | 0 |
| 0.1 | 0.003478 | 0.1 | 0.01223 | 0.037099 | 0.17606 |
| 0.2 | 0.013112 | 0.2 | 0.02607 | 0.061807 | 0.31638 |
| 0.3 | 0.026839 | 0.3 | 0.02732 | 0.05876 | 0.23671 |
| 0.4 | 0.042038 | 0.4 | 0.022125 | 0.051686 | 0.06291 |
| 0.5 | 0.055975 | 0.5 | 0.013716 | 0.029574 | -0.15726 |
| 0.6 | 0.065689 | 0.6 | 0.003347 | -0.00349 | -0.38968 |
| 0.7 | 0.06809 | 0.7 | -0.00468 | -0.0271 | -0.57884 |
| 0.8 | 0.062265 | 0.8 | -0.00447 | -0.02495 | -0.69529 |
| 0.9 | 0.055857 | 0.9 | 0.006846 | 0.033797 | -0.67443 |
| 1 | 0.070169 | 1 | 0.011742 | -0.02818 | -1.03821 |

(tenth embodiment)

focal length: f=3.27
F NO: F2.87
angle of view: 2ω=73.0°

|   | r | d | nd | νd |
|---|---|---|---|---|
| 1 | 1.070 | 0.47 | 1.54340 | 56.5 |
| 2 | 2.709 | 0.70 | | |
| 3 | -0.642 | 0.36 | 1.54340 | 56.5 |
| 4 | -0.755 | 0.04 | | |
| 5 | 6.966 | 0.90 | 1.54340 | 56.5 |
| 6 | 6.776 | 0.65 | | |
| 7 | ∞ | 0.50 | 1.51680 | 64.2 |
| 8 | ∞ | 0.45 | | |

$f/f_2=$ 0.06
$f/f_3=$ 0.01
$R_{31}/R_{32}=$ 1.03
$d_3/d_1=$ 1.91

$T/f=$ 1.20
$\alpha=$ 23.1° (maximum incident angle of the imaging lens array)

-0.2  0  0.2
spherical aberration

-0.2  0  0.2
astigmatic difference

-2  0  2
the distortion aberration

| SPHERICAL ABERRATION | | ASTIGMATIC FIELD | | DISTORTION |
| L HEIGHT | | FIELD HEIGHT  S | M | (PER CENT) |
|---|---|---|---|---|
| 0 | 0 | 0 | 0 | 0 |
| 0.1 | 0.001196 | 0.1 | 0.001701  0.010025 | 0.05343 |
| 0.2 | 0.004562 | 0.2 | 0.001043  0.016967 | 0.09252 |
| 0.3 | 0.009498 | 0.3 | -0.00417  0.020703 | 0.0512 |
| 0.4 | 0.015057 | 0.4 | -0.01044  0.023926 | -0.03493 |
| 0.5 | 0.019659 | 0.5 | -0.01749  0.011098 | -0.16414 |
| 0.6 | 0.020504 | 0.6 | -0.02521  -0.01311 | -0.30985 |
| 0.7 | 0.013581 | 0.7 | -0.02989  -0.03076 | -0.43082 |
| 0.8 | -0.00392 | 0.8 | -0.02641  -0.03326 | -0.53727 |
| 0.9 | -0.02814 | 0.9 | -0.01249  0.001994 | -0.58847 |
| 1 | -0.04927 | 1 | 0.001538  0.041963 | -0.80659 |

(first embodiment)
  aspherical coefficients surface NO.1
- K= 7.48078E-01
- A= -6.04735E-02
- B= -6.20478E-02
- C= -3.18582E-01
- D= 7.87948E-01
- E= -2.46510E+00 surface NO.2
- K= 8.51853E+00
- A= -2.39620E-02
- B= -2.97645E-01
- C= 1.38887E-01
- D= -7.88299E-01
- E= 3.02566E-01 surface NO.3
- K= -7.03613E-01
- A= -2.32901E-01
- B= -6.36573E-01
- C= 6.44097E-01
- D= -3.89759E-01
- E= -3.90147E+00 surface NO.4
- K= -6.91348E-01
- A= -5.31613E-02
- B= 2.39129E-01
- C= -2.19738E-01
- D= 1.71422E-01
- E= 1.68357E-01 surface NO.5
- K= -3.30057E+02
- A= -3.28172E-03
- B= -1.75158E-02
- C= 4.13467E-03
- D= 1.12813E-03
- E= -3.01220E-04 surface NO.6
- K= -7.72533E+01
- A= -1.01272E-01
- B= 3.87866E-02
- C= -1.48932E-02
- D= 2.24143E-03
- E= -1.00954E-04

(second embodiment)
  aspherical coefficients surface NO.1
- K= 7.84921E-01
- A= -7.16273E-02
- B= -1.78135E-01
- C= -2.84390E-01
- D= 5.13312E-01
- E= -8.82756E+00 surface NO.2
- K= 1.41632E+01
- A= -8.83105E-02
- B= -1.48582E-01
- C= -1.37468E+00
- D= 2.08512E+00
- E= -6.12316E+00 surface NO.3
- K= 3.91626E-01
- A= -6.96202E-02
- B= 7.65544E-01
- C= -2.69787E+00
- D= 8.54113E+00
- E= -1.13797E+01 surface NO.4
- K= -7.81095E-01
- A= -2.07426E-02
- B= 2.08767E-01
- C= -2.14769E-01
- D= 9.32411E-02
- E= 6.83663E-02 surface NO.5
- K= -4.35852E+03
- A= 3.34832E-03
- B= -1.86490E-02
- C= 3.91274E-03
- D= 1.52902E-03
- E= -3.38604E-04 surface NO.6
- K= -1.13002E+02
- A= -9.71389E-02
- B= 3.77819E-02
- C= -1.50315E-02
- D= 2.22413E-03
- E= -7.36919E-05

(third embodiment)
  aspherical coefficients surface NO.1
- K= 7.53062E-01
- A= -8.15791E-02
- B= -1.43920E-01
- C= -2.78638E-01
- D= 5.24653E-01
- E= -7.68301E+00 surface NO.2
- K= 1.41632E+01
- A= -7.95352E-02
- B= -1.68908E-01
- C= -1.47586E+00
- D= 2.06229E+00
- E= -4.34779E+00 surface NO.3
- K= 3.97029E-01
- A= -5.05988E-02
- B= 5.12500E-01
- C= -1.86975E+00
- D= 7.48345E+00
- E= -1.08501E+01 surface NO.4
- K= -7.76475E-01
- A= -2.01109E-02
- B= 2.09566E-01
- C= -2.12264E-01
- D= 9.02222E-02
- E= 6.40399E-02 surface NO.5
- K= -3.55445E+03
- A= 2.95831E-03
- B= -1.86005E-02
- C= 3.93185E-03
- D= 1.53893E-03
- E= -3.35674E-04 surface NO.6
- K= -1.24344E+02
- A= -9.78854E-02
- B= 3.85582E-02
- C= -1.52103E-02
- D= 2.19854E-03
- E= -7.70466E-05

FIG. 11

(fourth embodiment)
 aspherical coefficients

| surface NO.1 | surface NO.2 | surface NO.3 |
|---|---|---|
| K= 7.58085E-01 | K= 1.30735E+01 | K= 3.83820E-01 |
| A= -7.81318E-02 | A= -8.45685E-02 | A= -6.60500E-02 |
| B= -1.87107E-01 | B= -9.37071E-02 | B= 5.26206E-01 |
| C= -1.73416E-01 | C= -1.35708E+00 | C= -1.84849E+00 |
| D= 1.21159E-01 | D= 1.97817E+00 | D= 7.03709E+00 |
| E= -7.47788E+00 | E= -5.39245E+00 | E= -1.08391E+01 |

| surface NO.4 | surface NO.5 | surface NO.6 |
|---|---|---|
| K= -7.39599E-01 | K= -2.48754E+03 | K= -1.17900E+02 |
| A= -1.99491E-02 | A= 3.33357E-03 | A= -9.58039E-02 |
| B= 2.10655E-01 | B= -1.85730E-02 | B= 3.83673E-02 |
| C= -2.12827E-01 | C= 3.90952E-03 | C= -1.52612E-02 |
| D= 8.84231E-02 | D= 1.52346E-03 | D= 2.18115E-03 |
| E= 6.20761E-02 | E= -3.41942E-04 | E= -7.26208E-05 |

(fifth embodiment)
 aspherical coefficients

| surface NO.1 | surface NO.2 | surface NO.3 |
|---|---|---|
| K= 7.48985E-01 | K= 7.57792E+00 | K= -8.97053E-01 |
| A= -6.86867E-02 | A= -3.44823E-02 | A= -1.79254E-01 |
| B= 1.64166E-02 | B= -1.88214E-01 | B= -4.94224E-01 |
| C= -4.07882E-01 | C= 1.52898E-01 | C= 8.71113E-02 |
| D= 7.01302E-01 | D= -1.76320E+00 | D= -4.98284E-01 |
| E= -1.73481E+00 | E= 2.78818E+00 | E= 1.05807E+00 |

| surface NO.4 | surface NO.5 | surface NO.6 |
|---|---|---|
| K= -7.25458E-01 | K= -1.18944E+02 | K= -5.73337E+01 |
| A= -4.24943E-02 | A= 2.28870E-03 | A= -9.23172E-02 |
| B= 2.40807E-01 | B= -1.74288E-02 | B= 3.75461E-02 |
| C= -1.99127E-01 | C= 4.02148E-03 | C= -1.47682E-02 |
| D= 2.00621E-01 | D= 1.10878E-03 | D= 2.27663E-03 |
| E= 1.56753E-01 | E= -3.52412E-04 | E= -1.00335E-04 |

(sixth embodiment)
 aspherical coefficients

| surface NO.1 | surface NO.2 | surface NO.3 |
|---|---|---|
| K= 7.37367E-01 | K= 6.54104E+00 | K= -8.76056E-01 |
| A= -6.45125E-02 | A= -3.57179E-02 | A= -1.72988E-01 |
| B= 1.02038E-02 | B= -2.01432E-01 | B= -5.33685E-01 |
| C= -4.23315E-01 | C= 1.10565E-01 | C= 1.95083E-02 |
| D= 6.77308E-01 | D= -1.74018E+00 | D= -5.34638E-01 |
| E= -1.79325E+00 | E= 2.48105E+00 | E= 1.08003E+00 |

| surface NO.4 | surface NO.5 | surface NO.6 |
|---|---|---|
| K= -7.25819E-01 | K= -1.40897E+02 | K= -6.66225E+01 |
| A= -4.24362E-02 | A= 2.27660E-03 | A= -9.37439E-02 |
| B= 2.41158E-01 | B= -1.73927E-02 | B= 3.79510E-02 |
| C= -1.99876E-01 | C= 4.02880E-03 | C= -1.48315E-02 |
| D= 1.98962E-01 | D= 1.11029E-03 | D= 2.26311E-03 |
| E= 1.58600E-01 | E= -3.52444E-04 | E= -1.01973E-04 |

FIG. 12

(seventh embodiment)
   aspherical coefficients

| surface NO.1 | surface NO.2 | surface NO.3 |
|---|---|---|
| K= 6.95059E-01 | K= 8.19274E+00 | K= -6.89481E-01 |
| A= -5.07510E-02 | A= -2.55063E-02 | A= -2.70574E-01 |
| B= -1.16901E-01 | B= -3.09583E-01 | B= -6.75290E-01 |
| C= -1.34711E-01 | C= -5.03471E-02 | C= 9.30784E-01 |
| D= 1.08306E+00 | D= -4.93077E-01 | D= -1.58066E+00 |
| E= -3.28553E+00 | E= 6.91461E-02 | E= -4.68595E+00 |

| surface NO.4 | surface NO.5 | surface NO.6 |
|---|---|---|
| K= -7.16142E-01 | K= -5.13901E+02 | K= -2.00111E+02 |
| A= -4.79729E-02 | A= 2.25157E-03 | A= -9.69250E-02 |
| B= 2.45167E-01 | B= -1.71056E-02 | B= 3.87125E-02 |
| C= -1.94973E-01 | C= 4.18457E-03 | C= -1.47107E-02 |
| D= 1.96744E-01 | D= 1.15142E-03 | D= 2.28451E-03 |
| E= 1.79207E-01 | E= -3.43554E-04 | E= -1.00105E-04 |

(eighth embodiment)
   aspherical coefficients

| surface NO.1 | surface NO.2 | surface NO.3 |
|---|---|---|
| K= 7.05342E-01 | K= 7.50820E+00 | K= -7.58207E-01 |
| A= -4.60584E-02 | A= -2.16783E-02 | A= -2.55814E-01 |
| B= -8.44736E-02 | B= -3.37659E-01 | B= -6.06446E-01 |
| C= -3.16270E-01 | C= -3.92112E-02 | C= 6.69904E-01 |
| D= 7.66098E-01 | D= -7.75054E-01 | D= -1.03027E+00 |
| E= -3.04710E+00 | E= -6.01635E-01 | E= -3.87608E+00 |

| surface NO.4 | surface NO.5 | surface NO.6 |
|---|---|---|
| K= -7.07034E-01 | K= -2.89732E+02 | K= -1.32558E+02 |
| A= -5.23214E-02 | A= 2.14524E-03 | A= -9.73060E-02 |
| B= 2.38428E-01 | B= -1.69578E-02 | B= 3.83380E-02 |
| C= -2.04747E-01 | C= 4.19251E-03 | C= -1.47446E-02 |
| D= 1.99489E-01 | D= 1.15317E-03 | D= 2.27105E-03 |
| E= 1.76222E-01 | E= -3.45443E-04 | E= -1.03732E-04 |

(nineth embodiment) aspherical coefficients

| surface NO.1 | surface NO.2 | surface NO.3 |
|---|---|---|
| K= 6.93855E-01 | K= 8.37632E+00 | K= -7.47418E-01 |
| A= -5.71192E-02 | A= -2.72990E-02 | A= -2.55862E-01 |
| B= -8.28098E-02 | B= -2.98155E-01 | B= -6.26342E-01 |
| C= -2.51405E-01 | C= 4.48472E-02 | C= 8.34020E-01 |
| D= 1.10467E+00 | D= -7.72992E-01 | D= -1.46238E+00 |
| E= -3.10277E+00 | E= -6.72706E-01 | E= -4.19849E+00 |

| surface NO.4 | surface NO.5 | surface NO.6 |
|---|---|---|
| K= -7.07231E-01 | K= -4.03847E+02 | K= -1.97715E+02 |
| A= -5.30720E-02 | A= 2.48580E-03 | A= -9.78762E-02 |
| B= 2.38707E-01 | B= -1.69591E-02 | B= 3.84397E-02 |
| C= -1.98312E-01 | C= 4.21280E-03 | C= -1.47478E-02 |
| D= 1.93300E-01 | D= 1.15739E-03 | D= 2.27027E-03 |
| E= 1.78052E-01 | E= -3.44748E-04 | E= -1.03750E-04 |

FIG. 13

(tenth embodiment)
aspherical coefficients surface NO.1
K=   6.97115E-01
A=  -4.96988E-02
B=  -1.16097E-01
C=  -1.34085E-01
D=   1.08146E+00
E=  -3.24519E+00 surface NO.2
K=   8.35418E+00
A=  -2.27839E-02
B=  -3.05402E-01
C=  -3.14602E-02
D=  -4.63124E-01
E=   1.21817E-01 surface NO.3
K=  -7.00618E-01
A=  -2.60866E-01
B=  -6.58896E-01
C=   9.43543E-01
D=  -1.56994E+00
E=  -4.87540E+00 surface NO.4
K=  -7.11686E-01
A=  -5.14037E-02
B=   2.43265E-01
C=  -1.94672E-01
D=   1.97703E-01
E=   1.79848E-01 surface NO.5
K=  -4.92257E+02
A=   2.08110E-03
B=  -1.73194E-02
C=   4.12845E-03
D=   1.14264E-03
E=  -3.42138E-04 surface NO.6
K=  -1.66850E+02
A=  -9.43745E-02
B=   3.84663E-02
C=  -1.47421E-02
D=   2.28665E-03
E=  -9.75183E-05

FIG. 14

ASPHERICAL TYPE IMAGING LENS ARRAY

BACKGROUND OF THE INVENTION

1. Field of the Invention

The present invention relates to an imaging lens array, and more particularly to an aspherical type imaging lens array that comprises, from object side to image side, at least an aperture, a first lens, a second lens and a third lens.

2. Description of the Prior Art

Image sensor has been widely used in different areas nowadays. For example, the mobile phone also has been equipped with such an image sensor comprised of a solid state imaging device and lens, such as Charge Coupled Device (CCD) sensor. With the development of science and technology, the mobile phone is becoming more and more smaller, therefore the lens array in the mobile phone also needs to be miniaturized. To reduce the size of the lens array, the length of it must be shortened, however, this is likely to bring an adverse effect to the telecentric performance of the lens array.

A conventional solution to the telecentric problem of the mini imaging lens array is to arrange an aperture at the object side while arranging the exit pupil at a position far away from the image side. The lens array is usually made up of three plastic aspherical lenses. Below are three examples of conventional mini imaging lens arrays.

JP Published patent application No. 2004-4566 discloses an imaging lens array that comprises, from the object side, an aperture, a first biconvex lens having positive power, a second negative lens whose concave surface facing the object side, and a third meniscus lens whose convex surface facing the object side. Each of the lenses has at least an aspherical surface.

JP Published patent application No. 2004-226487 discloses an imaging lens array comprising, from the object side, a first positive lens with a convex surface facing the object side, an aperture formed either on the object side or the image side of the first positive lens, a second meniscus lens with a concave surface facing the object side, and a third meniscus lens with a convex surface facing the object side. The first and the second lenses each have at least an aspherical surface, and both side of the third lens are aspherical.

JP Published patent application No. 2004-240063 discloses an imaging lens array comprising, from the object side, a first positive lens with a convex surface facing the object side, a second meniscus lens with a concave surface facing the object side, and a third positive lens with a convex surface facing the object side.

However, the abovementioned lens arrays still have some shortcomings. For example, the magnification of the imaging lens array of JP Published patent application No. 2004-4566 is as high as 1.3–1.55, and when the magnification is 1.3, its corresponding Fno value will be 4.15. In this condition, the imaging lens array is unable to provide enough brightness. The magnification of the imaging lens array of JP Pt 2004-226487 is 1.44–1.88, and that of the imaging lens array of JP Pt 2004-240063 is also as high as 1.42–1.56.

By the way, the magnification (T/f) is the ratio of the focal length (f) to the entire optical length (T). The entire optical length T is the distance between the object side of the first lens and the image side.

The present invention has arisen to mitigate and/or obviate the afore-described disadvantages.

SUMMARY OF THE INVENTION

The primary objective of the present invention is to provide an aspherical type imaging lens array comprising, from object side to image side, at least an aperture, a first lens, a second lens and a third lens.

The first lens is a positive meniscus lens with a convex surface facing the object side.

The second lens is a meniscus lens with a convex surface facing the image side.

The third lens is a meniscus lens with a convex surface facing the object side; and the first lens, the second lens and the third lens are made of plastic and each has two aspherical surfaces, a focal length of the aspherical type imaging lens array is f, a focal length of the second lens is f2, and a focal length of the third lens is f3, they satisfy below equation:

$$-0.20 < f/f2 < 0.15$$

$$-0.25 < f/f3 < 0.20$$

when f/f2 is less than −0.2, the power of the third lens L3 should be improved in order to solve the spherical aberration, meanwhile, the back focus will be lengthened. When f/f2 is greater than 1.5, the power of the first lens L1 will become weak, resulting in an overlong optical length of the image lens array. When f/f3 is less than −0.25, the corresponding telescentric performance will not be good, and the back focus will also be shortened, so that there will be no enough space for the parallel flat glass 2. When f/f3 is greater than 0.2, the corresponding back focus will be too long.

R31 and R32 represent the radius of curvature of the object side and the image side of the third lens L3, respectively, and the ratio of R31 to R32 preferably satisfy the below equation: 0.5<R31/R32<3.0.

When R31/R32 is less than 0.5, the power of the third lens L3 will become stronger while the power of the first lens will become weak, as a result, the optical length of the imaging lens array will be lengthen, and so will be the back focus. When R31/R32 is greater than 3.0, the corresponding telecentric performance will not be good. To solve this problem, the angle of inclination (the angle between the normal line and the optical axis) of the periphery of the aspherical surface of the third lens L3 needs to be increased, and this will make the production process more complicated.

When d1 and d3 represent the thickness of the first and the third lenses, respectively, the ratio of d1 to d3 preferably satisfy the below equation as: 1.5<d3/d1<2.1.

When d3/d1 is less than 1.5, the first lens L1 will become too thick, and the optical length of the imaging lens array will be too large. When d3/d1 is less than 2.1, the first lens L1 will become too thin, however, for production of the lens, the side plane thickness must be maintained at a certain value, and the Fno must be increased, as a result, the image lens array will become dark.

The present invention will become more obvious from the following description when taken in connection with the accompanying drawings, which show, for purpose of illustrations only, the preferred embodiments in accordance with the present invention.

BRIEF DESCRIPTION OF THE DRAWINGS

FIG. 2B shows the real numerical values of the respective lens of the second embodiment;

FIG. 11 shows the aspherical coefficients of the imaging lens arrays in accordance with the first, second and third embodiments of the present invention;

FIG. 12 shows the aspherical coefficients of the imaging lens arrays in accordance with the fourth, fifth and sixth embodiments of the present invention;

FIG. 13 shows the aspherical coefficients of the imaging lens arrays in accordance with the seventh, eighth and ninth embodiments of the present invention;

FIG. 14 shows the aspherical coefficient of the imaging lens array in accordance with the tenth embodiments of the present invention.

DETAILED DESCRIPTION OF THE PREFERRED EMBODIMENTS

Figure 1A:
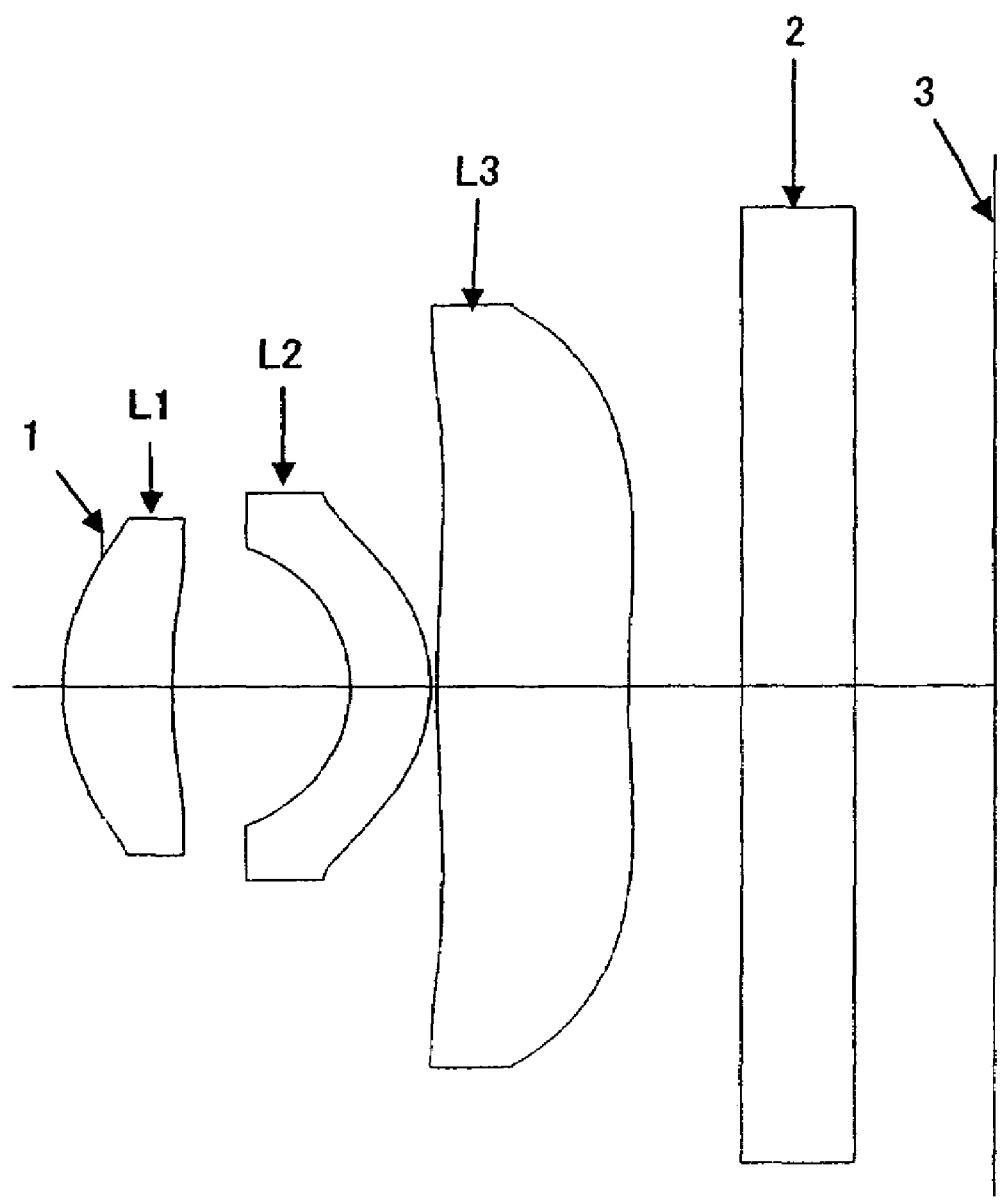
FIG. 1A shows an imaging lens array in accordance with a first embodiment of the present invention.
Figure 1B:
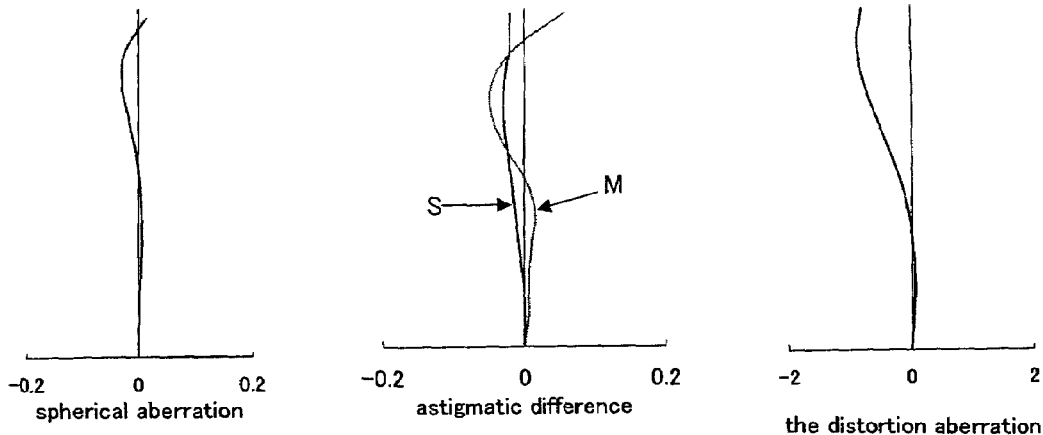
FIG. 1B shows the real numerical values of the respective lens of the first embodiment.
Figure 2A:
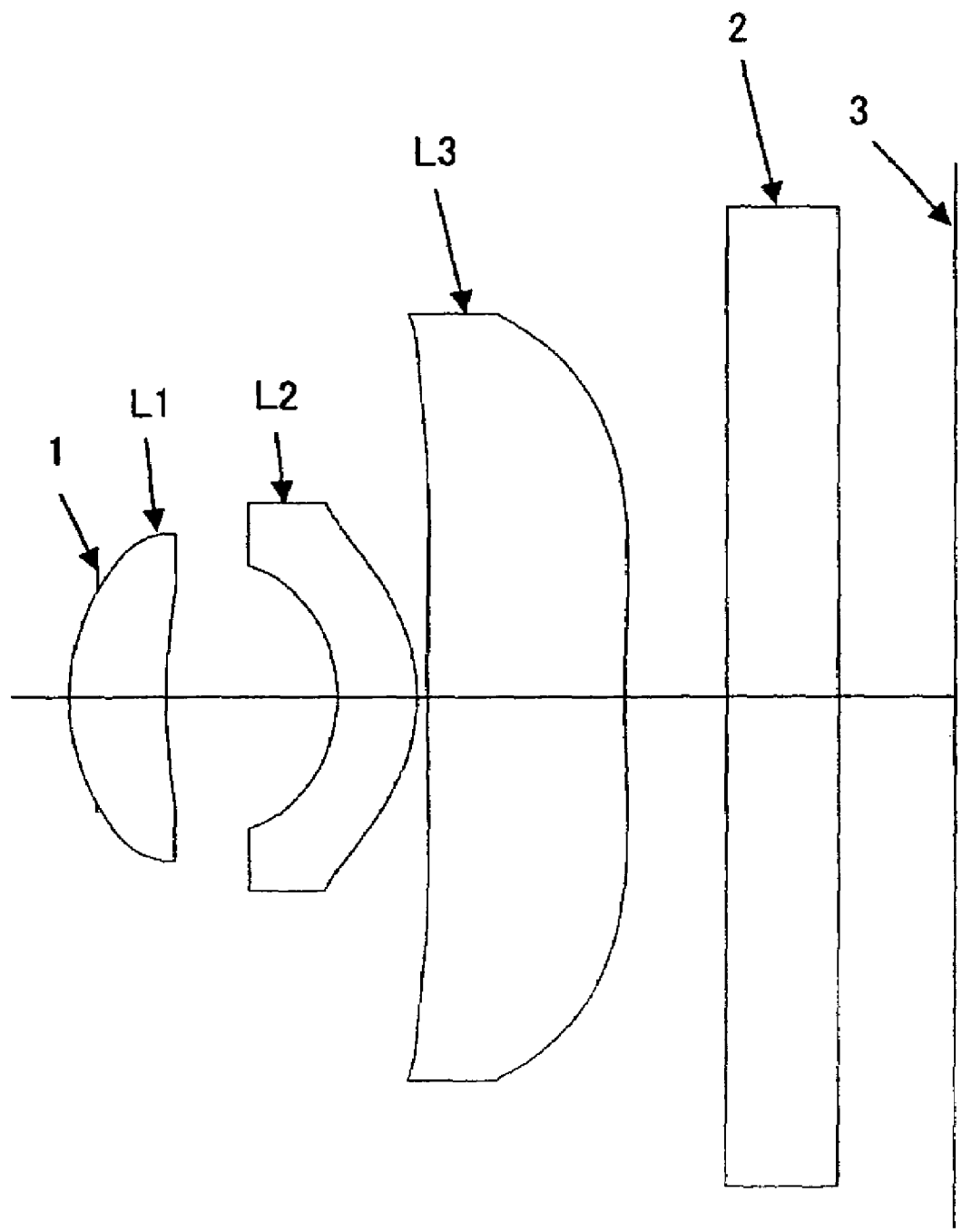
FIG. 2A shows an imaging lens array in accordance with a second embodiment of the present invention.
Figure 3A:
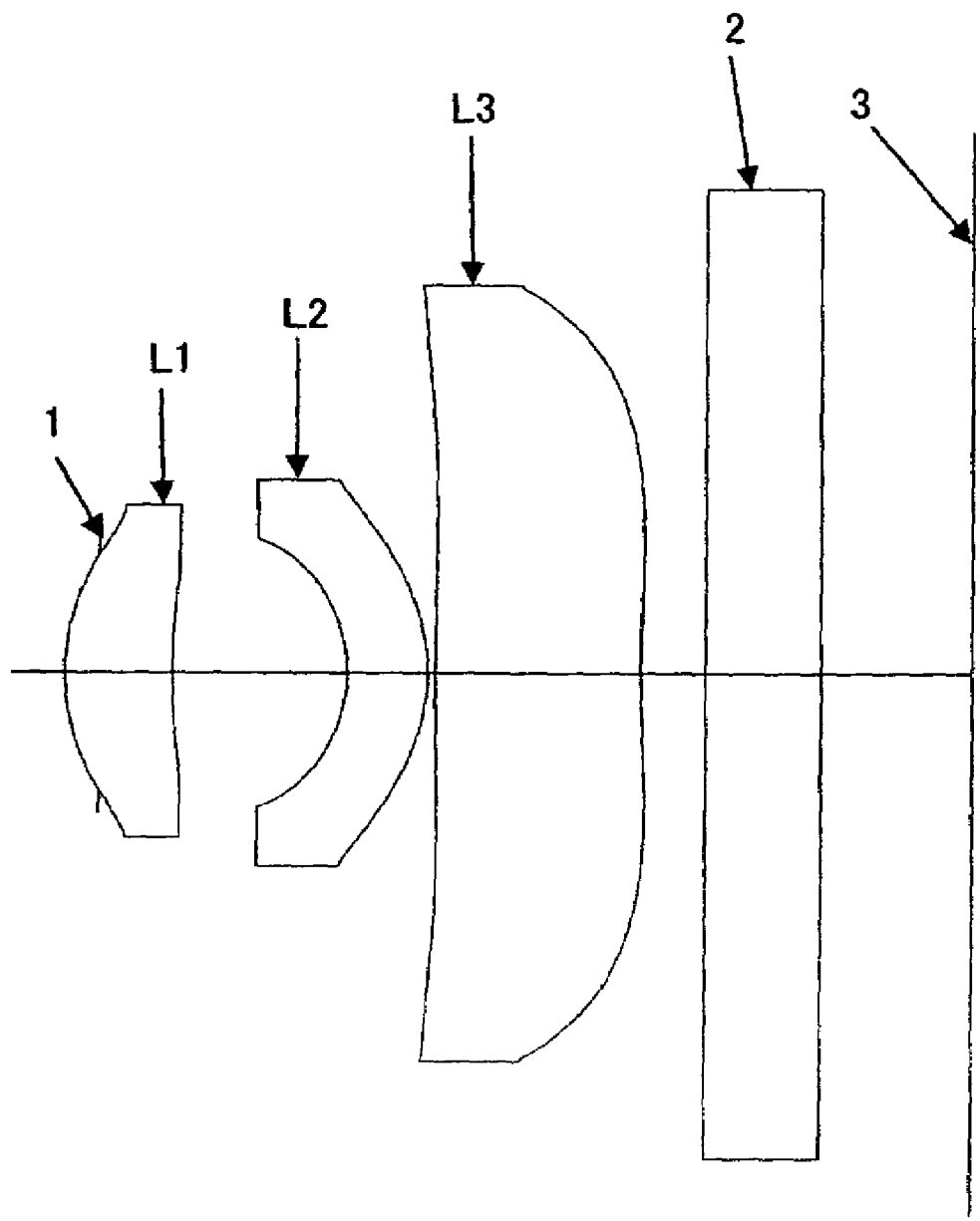
FIG. 3A shows an imaging lens array in accordance with a third embodiment of the present invention.
Figure 3B:
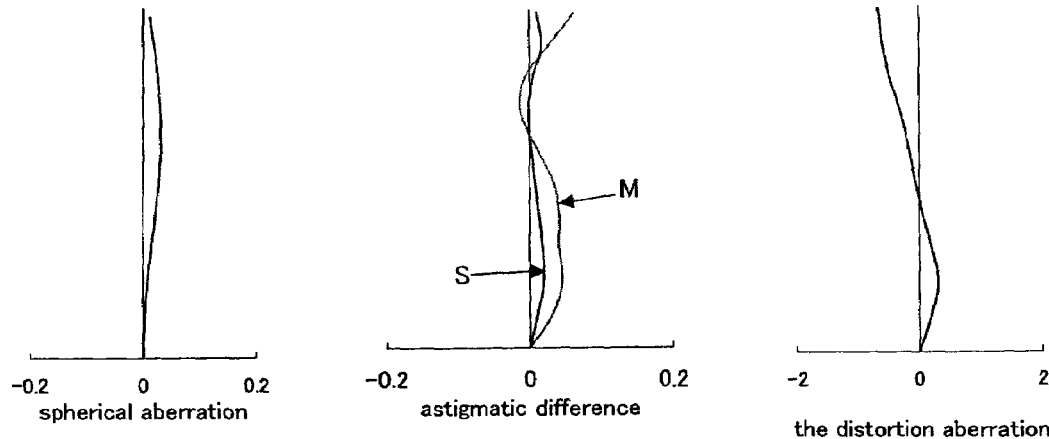
FIG. 3B shows the real numerical values of the respective lens of the third embodiment.
Figure 4A:
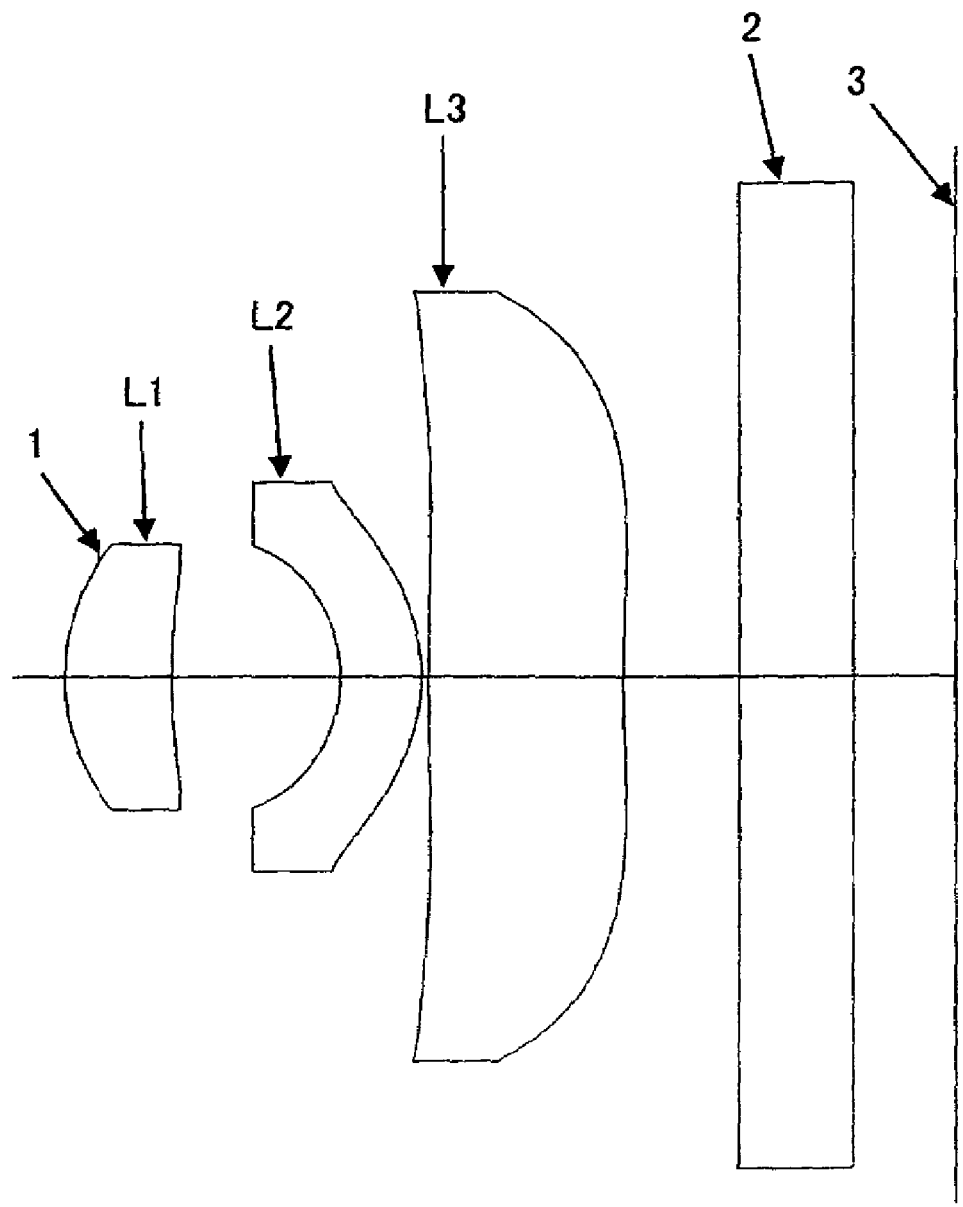
FIG. 4A shows an imaging lens array in accordance with a fourth embodiment of the present invention.
Figure 4B:
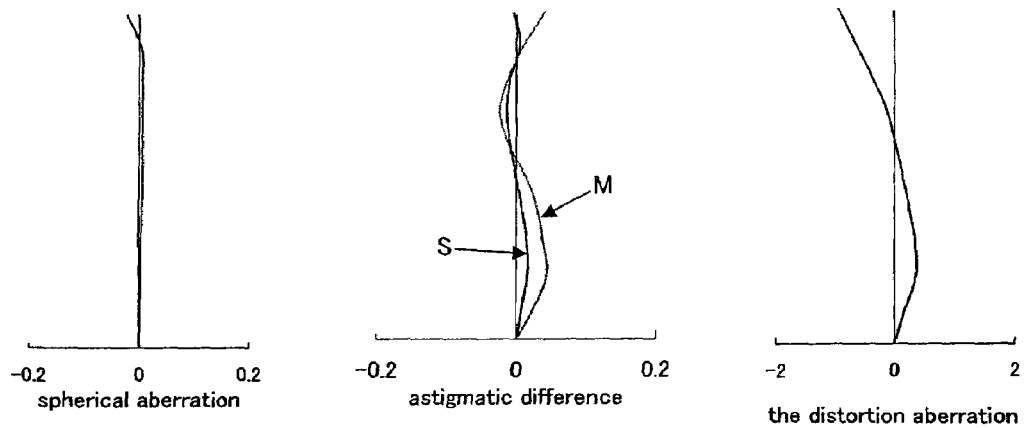
FIG. 4B shows the real numerical values of the respective lens of the fourth embodiment.
Figure 5A:
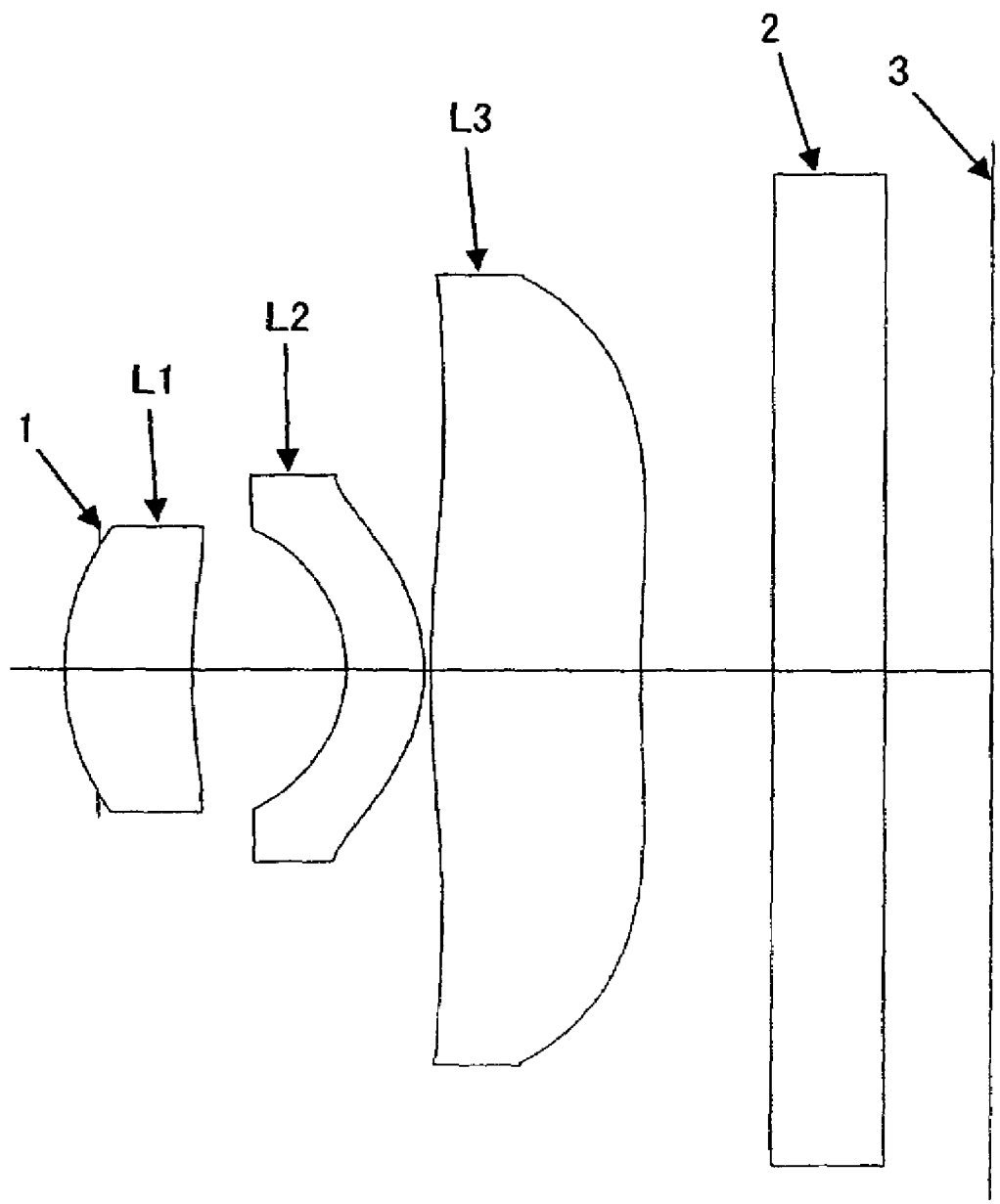
FIG. 5A shows an imaging lens array in accordance with a fifth embodiment of the present invention.
Figure 5B:
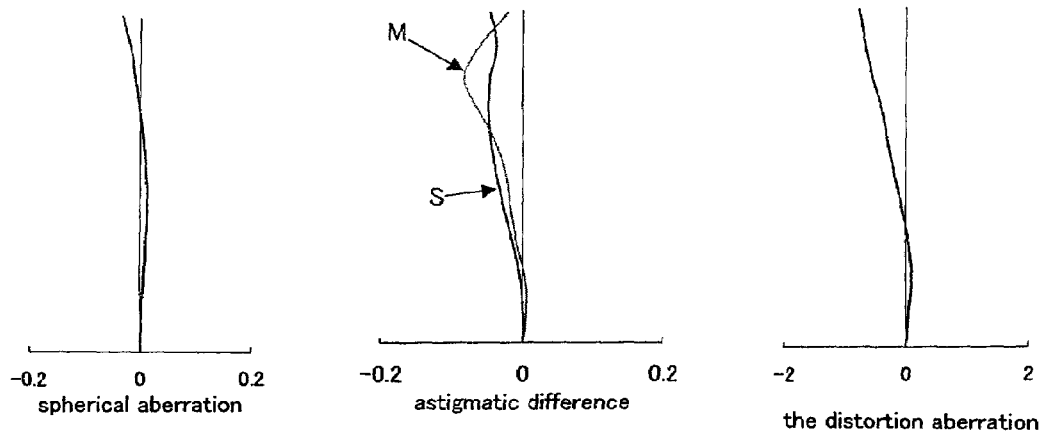
FIG. 5B shows the real numerical values of the respective lens of the fifth embodiment.
Figure 6A:
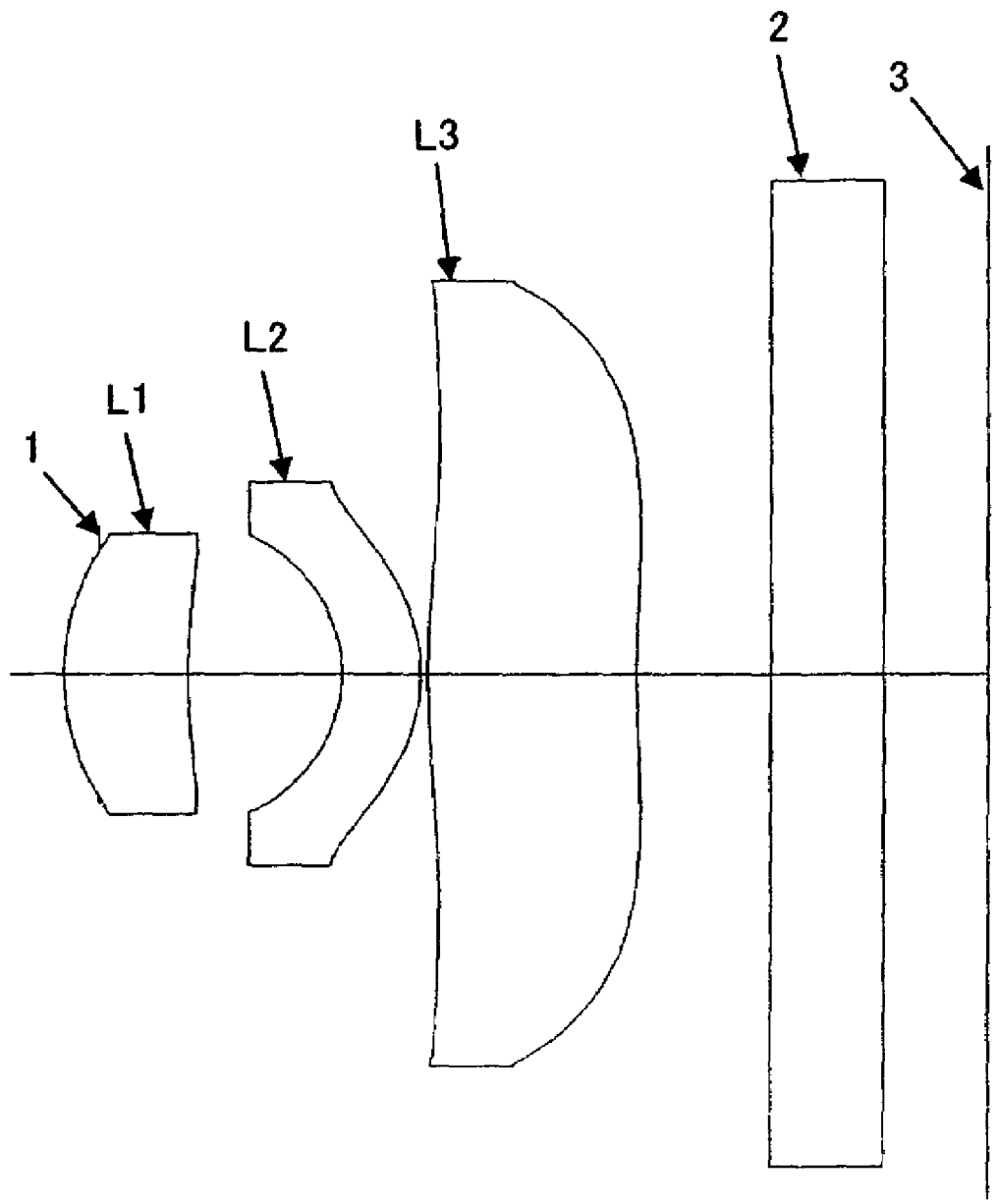
FIG. 6A shows an imaging lens array in accordance with a sixth embodiment of the present invention.
Figure 6B:
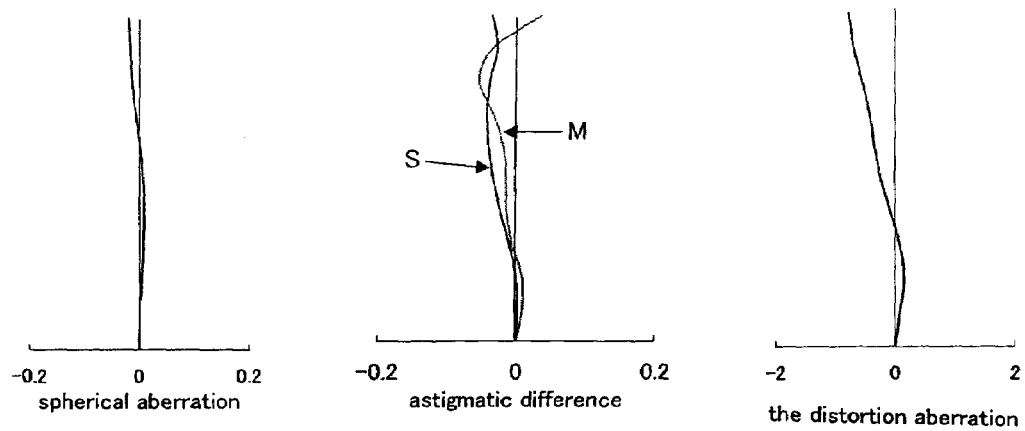
FIG. 6B shows the real numerical values of the respective lens of the sixth embodiment.
Figure 7A:
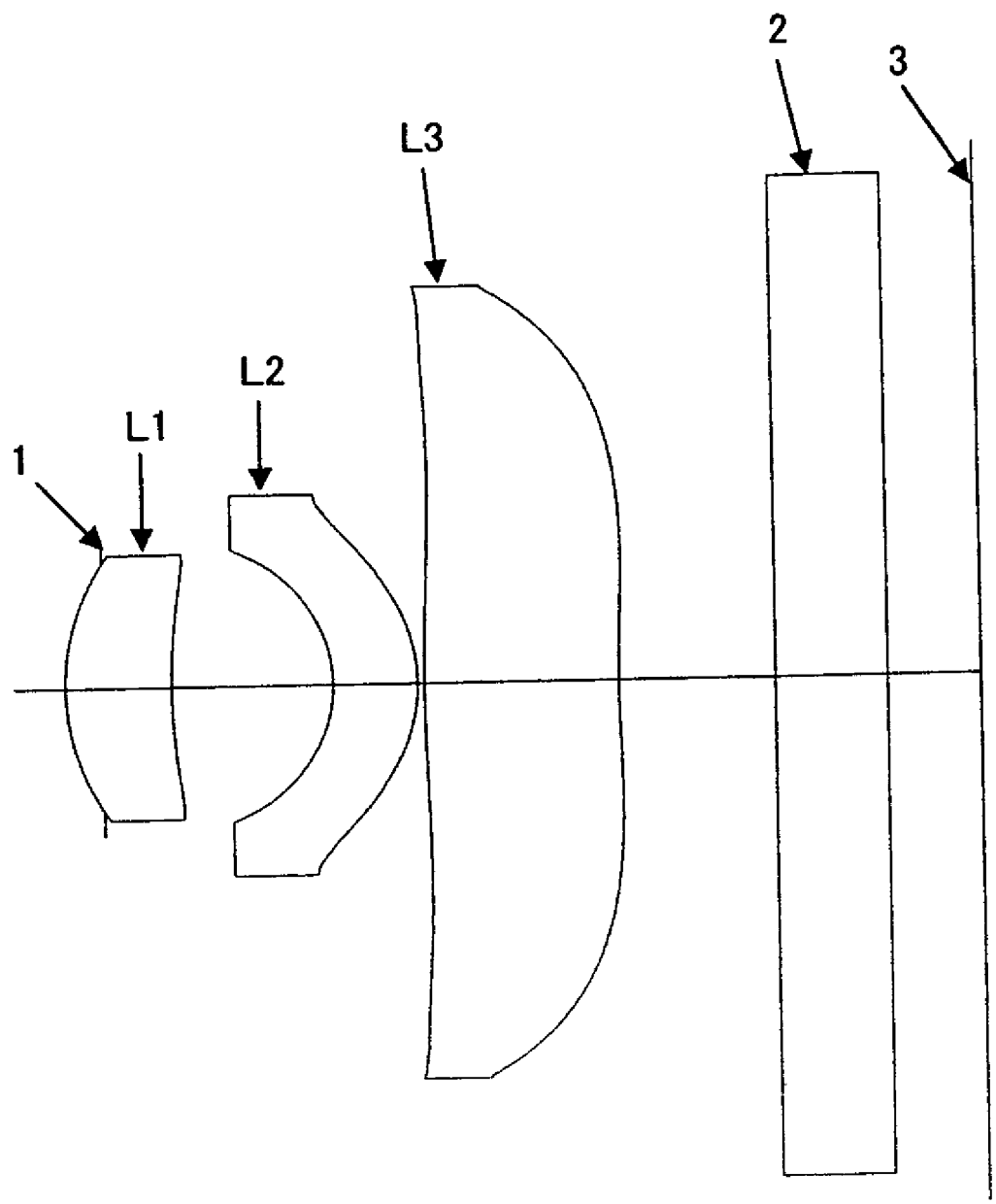
FIG. 7A shows an imaging lens array in accordance with a seventh embodiment of the present invention.
Figure 7B:
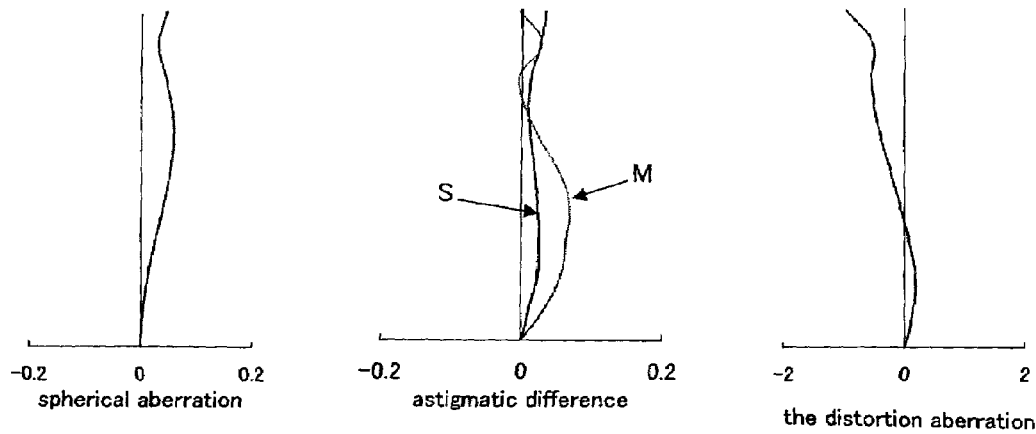
FIG. 7B shows the real numerical values of the respective lens of the seventh embodiment.
Figure 8A:
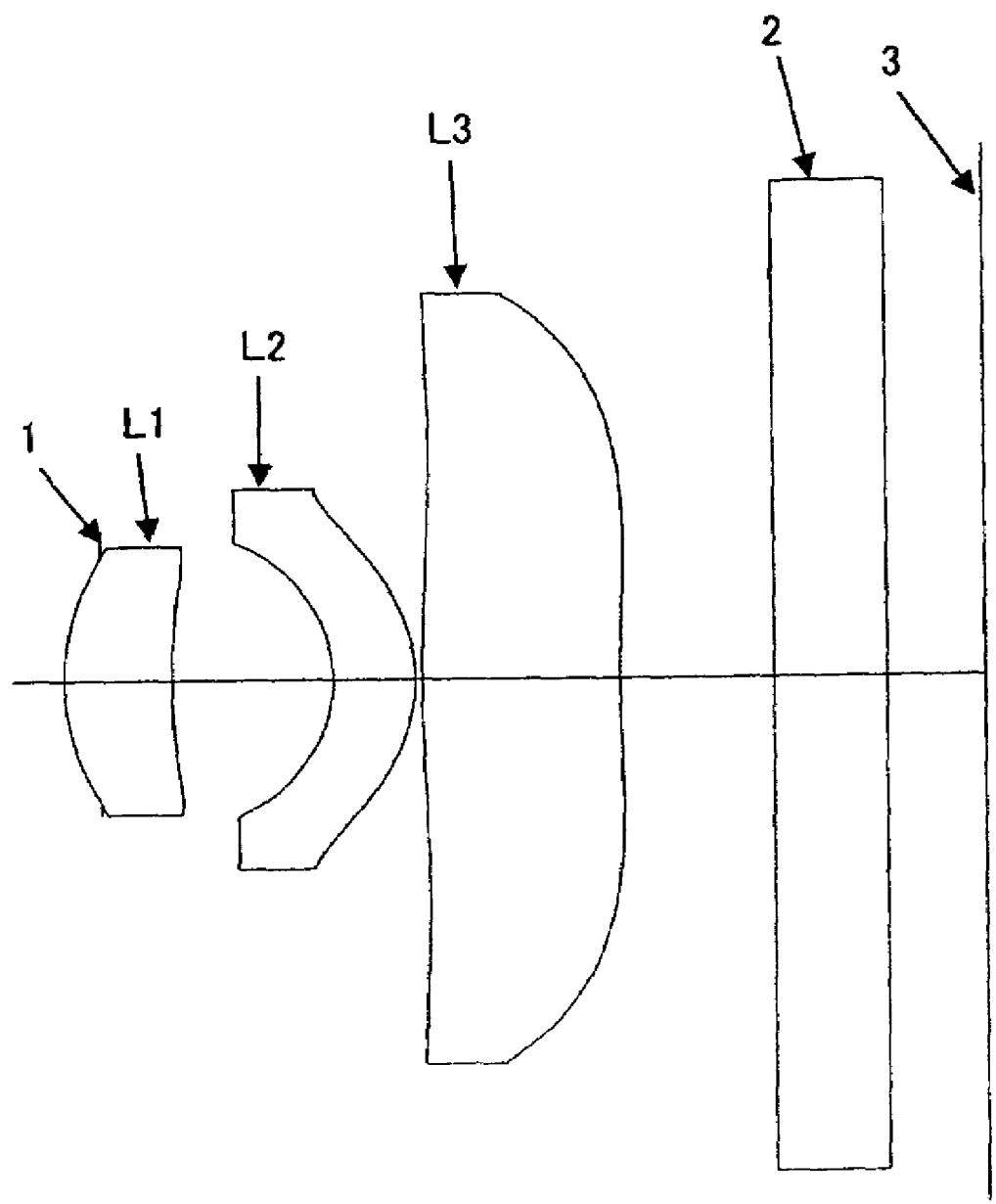
FIG. 8A shows an imaging lens array in accordance with an eighth embodiment of the present invention.
Figure 8B:
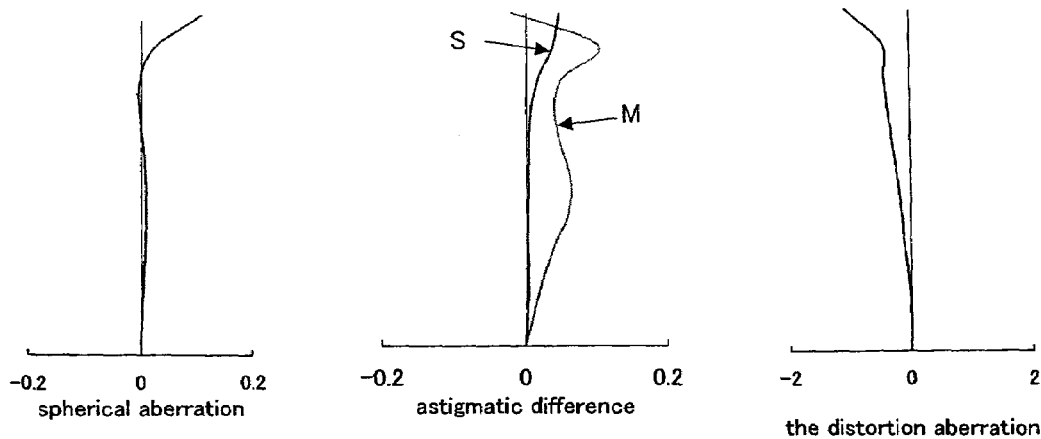
FIG. 8B shows the real numerical values of the respective lens of the eighth embodiment.
Figure 9A:
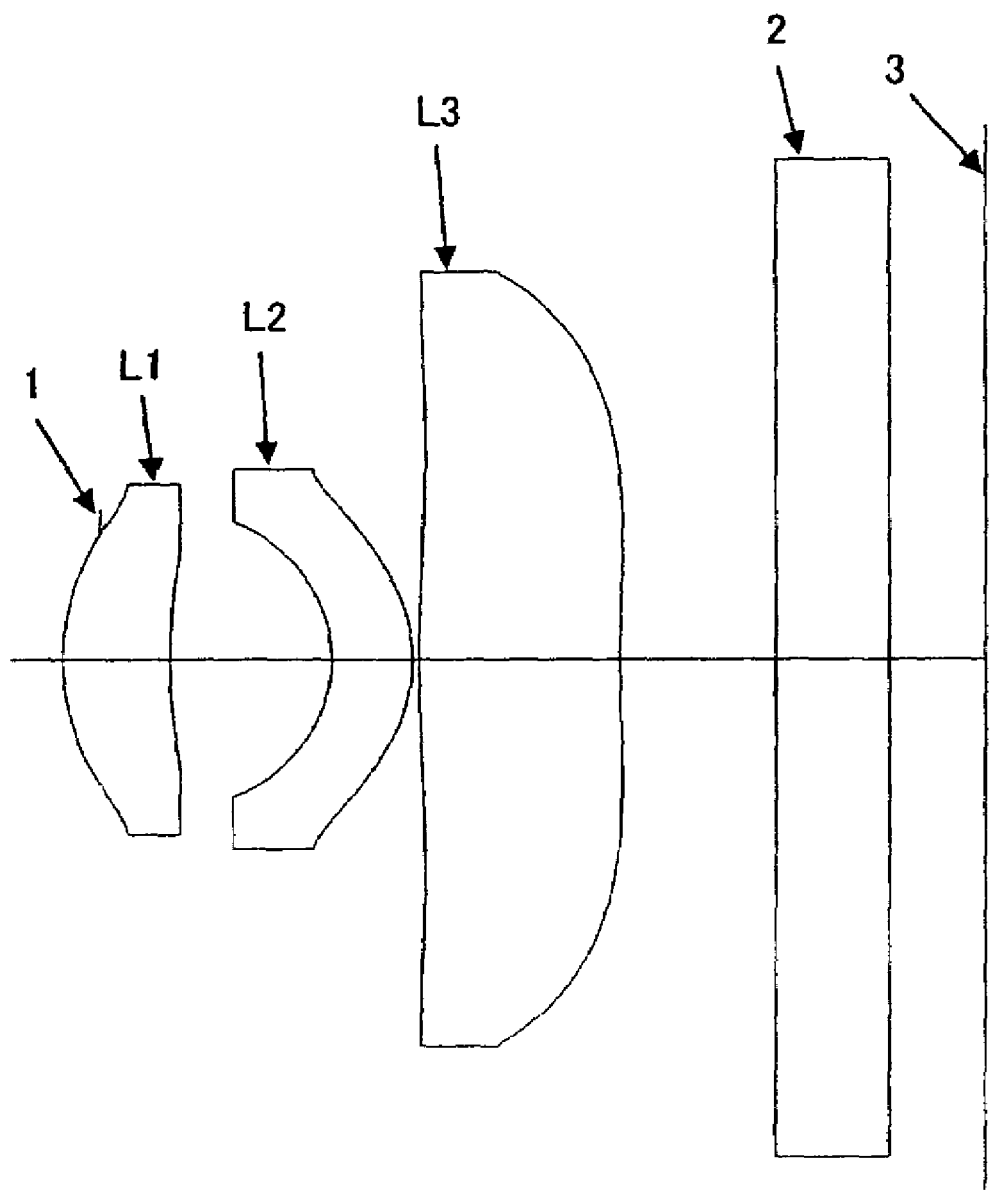
FIG. 9A shows an imaging lens array in accordance with a ninth embodiment of the present invention.
Figure 9B:
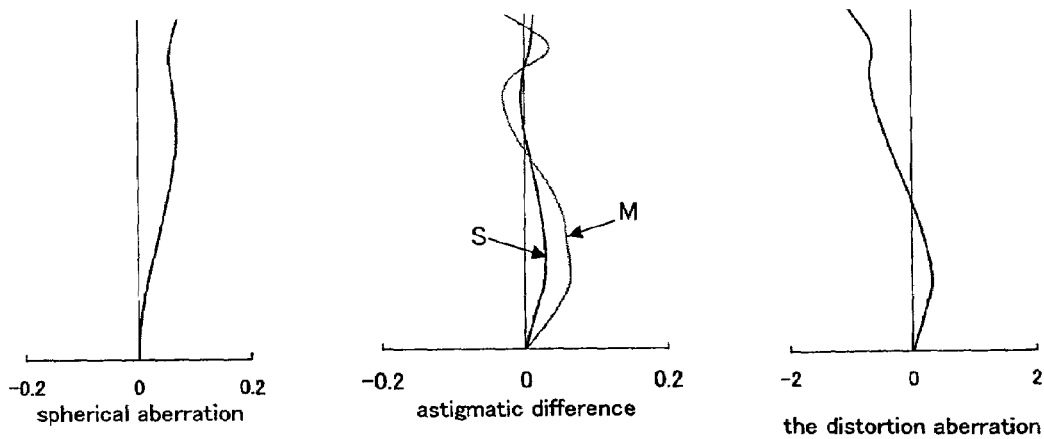
FIG. 9B shows the real numerical values of the respective lens of the ninth embodiment.
Figure 10A:
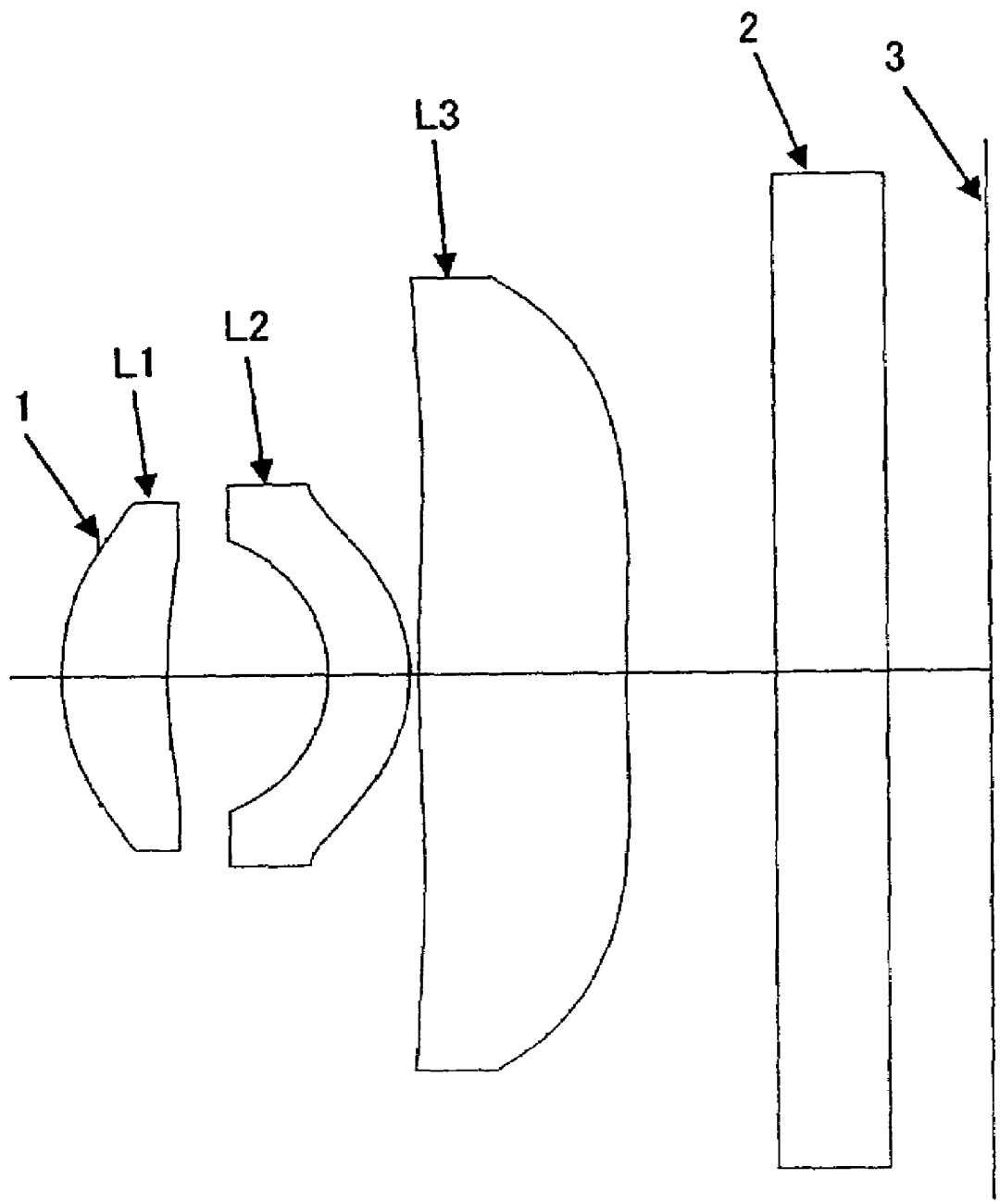
FIG. 10A shows an imaging lens array in accordance with a tenth embodiment of the present invention.
Figure 10B:
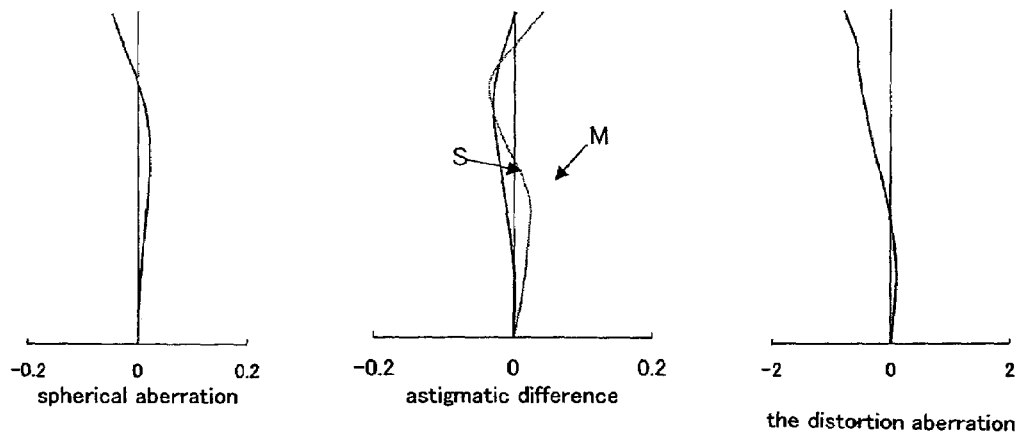
FIG. 10B shows the real numerical values of the respective lens of the tenth embodiment.

Referring to FIGS. 1A to 10A, which show different imaging lens arrays in accordance with seven embodiments of the present invention, and the imaging lens arrays comprises, from the object side, an aperture 1, a first lens L1, a second lens L2, a third lens L3, a parallel flat glass 2 and an image-forming plane 3.

The first lens L1 is a positive meniscus lens with a convex surface facing the object side. The second lens L2 can be a positive or negative meniscus lens with a convex surface facing the image side. The third lens L3 also can be a positive or negative meniscus lens with a convex surface facing the object side. The third lens L3 is formed with point of inflexion. The parallel flat glass 2 has infrared filter function, and the image-forming plane 3 is CCD or other device of the like.

The respective lenses are made of the same plastic material and are more competitive in terms of material cost and management cost, as compared with glass lens. Furthermore, the plastic lens can be made into aspherical form, so that a desired optical performance can be achieved simply using three lenses.

The real numerical values of the respective embodiments should be referred to the attached FIGS. 1B–10B, firstly, the meaning of the letters and codes in the respective drawings are explained as follows:

Fno~F $2\omega$ represents the angle of view f represents the focal length of the imaging lens array The Arabic numbers 1, 2, 3 . . . . 8 represent the sequence number of the surfaces of the respective lenses from the object side. For example, the front surface and the rear surface of the first lens L1 are designated by 1 and 2, respectively. 3 and 4 represent both sides of the second lens L2, 5 and 6 represent both sides of the third lens L3, while 7 and 8 represent both sides of the parallel flat glass 2. $\infty$ represents the radius of curvature (mm). d represents the thickness and its unit is mm.

The respective tables also show the spherical aberration, the astigmatic difference and the distortion aberration of the respective embodiments. The data of the d line is shown in each of the drawings, and the astigmatic difference includes the Sazitaru (S) plane and the merizionaru (M) plane.

Both sides of the respective lenses are aspherical and the aspherical coefficients of the respective lenses are indicated by A, B, C D and E, the height of the optical axis is H, and the deflection of the optical axis is X, and then a formula will be satisfied:

$$X=(1/R)\,H2/[1+\{1-(1+K)(H/R)2\}1/2]+AH4+BH6+CH8+DH10+EH12$$

The capital R in this formula represents the paraxial radius of curvature, K represents the conical coefficients, the aspherical coefficient E-03 represents $10^{-3}$.

The focal length of the imaging lens array of this invention is f, f2 and f3 represent the focal length of the first lens L2 and L3, respectively, and the present invention can satisfy the following equations:

$$-0.20<f/f2<0.15$$

$$-0.25<f/f3<0.20$$

When f/f2 is less than −0.2, the power of the third lens L3 should be improved in order to solve the spherical aberration, meanwhile, the back focus will be lengthened. When f/f2 is greater than 1.5, the power of the first lens L1 will become weak, resulting in an overlong optical length of the image lens array. When f/f3 is less than −0.25, the corresponding telescentric performance will not be good, and the back focus will also be shortened, so that there will be no enough space for the parallel flat glass 2. when f/f3 is greater than 0.2, the corresponding back focus will be too long.

R31 and R32 represent the radius of curvature of the object side and the image side of the third lens L3, respectively, and the ratio of R31 to R32 preferably satisfy the below equation: 0.5<R31/R32<3.0.

When R31/R32 is less than 0.5, the power of the third lens L3 will become stronger while the power of the first lens will become weak, as a result, the optical length of the imaging lens array will be lengthen, and so will be the back focus. When R31/R32 is greater than 3.0, the corresponding telecentric performance will not be good. To solve this problem, the angle of inclination (the angle between the normal line and the optical axis) of the periphery of the aspherical surface of the third lens L3 needs to be increased, and this will make the production process more complicated.

When d1 and d3 represent the thickness of the first and the third lenses, respectively, the ratio of d1 to d3 preferably satisfy the below equation as: 1.5<d3 d1<2.1.

When d3/d1 is less than 1.5, the first lens L1 will become too thick, and the optical length of the imaging lens array will be too large. When d3/d1 is less than 2.1, the first lens L1 will become too thin, however, for production of the lens, the side plane thickness must be maintained at a certain value, and the Fno must be increased, as a result, the image less array will become dark.

The T/f of the imaging lens array in accordance with the present invention can be reduced to less than 1.2, so that the corresponding size of the imaging lens will become very small. Furthermore, the maximum incident angle of the imaging lens array can be as high as 24.5, therefore, the telecentric performance can be ensured.

While we have shown and described various embodiments in accordance with the present invention, it should be clear to those skilled in the art that further embodiments may be made without departing from the scope of the present invention.

TABLE 1

|  | $f/f_2$ | $f/f_3$ | $R_{31}/R_{32}$ | $d_3/d_1$ | T/f | α |
|---|---|---|---|---|---|---|
| first embodiment | 0.02 | −0.05 | 1.22 | 1.75 | 1.15 | 23.0° |
| second embodiment | −0.02 | −0.17 | 2.68 | 2.02 | 1.12 | 24.5° |
| third embodiment | −0.07 | −0.17 | 2.23 | 1.93 | 1.11 | 24.5° |
| fourth embodiment | −0.08 | −0.15 | 2.00 | 1.87 | 1.11 | 24.5° |
| fifth embodiment | −0.13 | 0.12 | 0.76 | 1.66 | 1.19 | 23.1° |
| sixth embodiment | −0.14 | 0.12 | 0.77 | 1.67 | 1.18 | 23.1° |
| seventh embodiment | 0.07 | −0.01 | 1.08 | 1.89 | 1.19 | 23.1° |
| eighth embodiment | 0.06 | 0.01 | 1.03 | 1.87 | 1.20 | 23.1° |

TABLE 1-continued

|  | $f/f_2$ | $f/f_3$ | $R_{31}/R_{32}$ | $d_3/d_1$ | T/f | α |
|---|---|---|---|---|---|---|
| nineth embodiment | 0.01 | 0.04 | 0.92 | 1.87 | 1.19 | 23.1° |
| tenth embodiment | 0.06 | 0.01 | 1.03 | 1.91 | 1.20 | 23.1° |

What is claimed is:

1. An aspherical type imaging lens array comprising, from object side to image side, at least an aperture, a first lens, a second lens and a third lens;
   wherein the first lens is a positive meniscus lens with a convex surface facing the object side;
   the second lens is a meniscus lens with a convex surface facing the image side;
   the third lens is a meniscus lens with a convex surface facing the object side; and
   the first lens, the second lens and the third lens are made of plastic and each has two aspherical surfaces, a focal length of the aspherical type imaging lens array is f, a focal length of the second lens is f2, and a focal length of the third lens is f3, they satisfy below equations:

$-0.20 < f/f2 < 0.15$ $-0.25 < f/f3 < 0.20$.

2. The aspherical type imaging lens array as claimed in claim 1, wherein R31 and R32 represent a radius of curvature of an object side and an image side of the third lens, respectively, and a ratio of R31 to R32 satisfy the below equation: 0.5<R31/R32<3.0.

3. The aspherical type imaging lens array as claimed in claim 1, wherein d1 and d3 represent a thickness of the first and the third lenses, respectively, a ratio of d1 to d3 satisfies the below equation as: 1.5<d3/d1<2.1.

* * * * *